US012531265B2

(12) United States Patent
Morishita (10) Patent No.: US 12,531,265 B2
(45) Date of Patent: Jan. 20, 2026

(54) BATTERY MODULE (71) Applicant: SANYO Electric Co., Ltd., Osaka (JP)

(72) Inventor: Taijyu Morishita, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 636 days.

(21) Appl. No.: 17/906,481

(22) PCT Filed: Jan. 20, 2021

(86) PCT No.: PCT/JP2021/001785
§ 371 (c)(1),
(2) Date: Sep. 16, 2022

(87) PCT Pub. No.: WO2021/199593
PCT Pub. Date: Oct. 7, 2021

(65) Prior Publication Data
US 2023/0187683 A1 Jun. 15, 2023

(30) Foreign Application Priority Data

Mar. 31, 2020 (JP) ................ 2020-064244

(51) Int. Cl.
*H01M 10/04* (2006.01)
*H01M 50/209* (2021.01)
(Continued)

(52) U.S. Cl.
CPC ..... *H01M 10/0481* (2013.01); *H01M 50/209* (2021.01); *H01M 50/233* (2021.01); *H01M 50/291* (2021.01); *H01M 50/293* (2021.01)

(58) Field of Classification Search
CPC ........... H01M 50/20–211; H01M 50/218–222; H01M 50/227–238; H01M 10/04; H01M 10/0481
See application file for complete search history.

(56) References Cited

U.S. PATENT DOCUMENTS

2014/0014420 A1\* 1/2014 Nakamura .......... H01M 10/647
180/65.1
2016/0308186 A1 10/2016 Han
(Continued)

FOREIGN PATENT DOCUMENTS

EP 1939956 A1 7/2008
JP 2008-053072 A 3/2008
(Continued)

OTHER PUBLICATIONS

International Search Report of PCT application No. PCT/JP2021/001785 dated Mar. 30, 2021.
(Continued)

*Primary Examiner* — Jonathan Crepeau
*Assistant Examiner* — Jacob Buchanan
(74) *Attorney, Agent, or Firm* — WHDA, LLP (57) ABSTRACT

A battery module includes: battery stack in which a plurality of batteries are stacked; end plate provided outside battery at an end in a stacking direction of the plurality of batteries; and end separator provided between battery at the end and end plate, end separator including first support member that supports a peripheral edge of a surface intersecting the stacking direction of battery at the end, and second support member that supports a central part of the surface and has lower rigidity with respect to deformation in the stacking direction than first support member.

3 Claims, 6 Drawing Sheets

(51) Int. Cl.
*H01M 50/233* (2021.01)
*H01M 50/291* (2021.01)
*H01M 50/293* (2021.01)

(56) References Cited

U.S. PATENT DOCUMENTS

2021/0135317 A1 5/2021 Oka et al.
2022/0359945 A1* 11/2022 Kogami .............. H01M 50/291

FOREIGN PATENT DOCUMENTS

| JP | 2009-081056 | 4/2009 |
| WO | 2013/161655 | 10/2013 |
| WO | 2019/142645 | 7/2019 |

OTHER PUBLICATIONS

English Translation of Chinese Search Report dated Nov. 29, 2023, issued in counterpart CN application No. 202180013164.6. (2 pages).
Extended (Supplementary) European Search Report dated Mar. 20, 2024, issued in counterpart EP Application No. 21780195.0. (9 pages).

\* cited by examiner

BATTERY MODULE

CROSS-REFERENCE TO RELATED APPLICATIONS

This application is a U.S. national stage application of the PCT International Application No. PCT/JP2021/001785 filed on Jan. 20, 2021, which claims the benefit of foreign priority of Japanese patent application No. 2020-064244 filed on Mar. 31, 2020, the contents all of which are incorporated herein by reference.

TECHNICAL FIELD

The present invention relates to a battery module.

BACKGROUND ART

For example, as a power source for a vehicle or the like that requires a high output voltage, there has been known a battery module formed by electrically connecting a plurality of batteries to each other. In general, in each battery constituting a battery module, an internal electrode body, an electrolyte, and the like degrade over time, and bulge due to deposition or oxidation of a metal material, and a change appears in an outer shape. Regarding a battery module including such a battery, PTL 1 discloses a battery module including a battery stack in which a plurality of batteries are stacked and an insulating sheet is interposed between the batteries, and end plates provided at both ends in the stacking direction of the battery stack.

CITATION LIST

Patent Literature

PTL 1: WO 2013/161655 A

SUMMARY OF THE INVENTION

When each battery expands due to aging degradation, the dimension of the battery stack increases in the stacking direction, a load due to a dimensional variation of all the batteries is applied to the end plates at both ends of the battery stack, and a reaction force thereof is applied to each battery, which may cause a failure such as breakage of the battery. For example, a spring that is displaced in the stacking direction may be stacked together with the battery to suppress the generation of an excessive reaction force. However, when an impact load is generated, the battery is largely displaced with the displacement of the spring, and there is a concern that the bus bar connected to each battery is damaged.

The present invention has been made in view of such circumstances, and an object of the present invention is to provide a technique for suppressing displacement of a battery against a collision load while reducing a reaction force generated in a stacking direction in a battery module.

A battery module according to an aspect of the present invention includes: a battery stack in which a plurality of batteries are stacked; an end plate provided outside a battery at an end in a stacking direction of the plurality of batteries; and an end separator provided between the battery at the end and the end plate, the end separator including a first support member that supports a peripheral edge of a surface intersecting the stacking direction of the battery at the end, and a second support member that supports a central part of the surface and has lower rigidity with respect to deformation in the stacking direction than the first support member.

According to the present invention, it is possible to suppress displacement of a battery against a collision load while reducing a reaction force generated in a stacking direction in a battery module.

DESCRIPTION OF EMBODIMENT

Hereinafter, the present invention will be described based on a preferred exemplary embodiment with reference to the drawings. The exemplary embodiment is not intended to limit the invention but is an example, and all features described in the exemplary embodiment and combinations thereof are not necessarily essential to the invention. The same or equivalent constituent elements, members, and processing illustrated in the drawings are denoted by the same reference numerals, and a redundant description will be omitted as appropriate. The scale and the shape of each part illustrated in each figure are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. From each of the drawings, some of members not important for describing the exemplary embodiments are omitted.

Exemplary Embodiment

Figure 1:
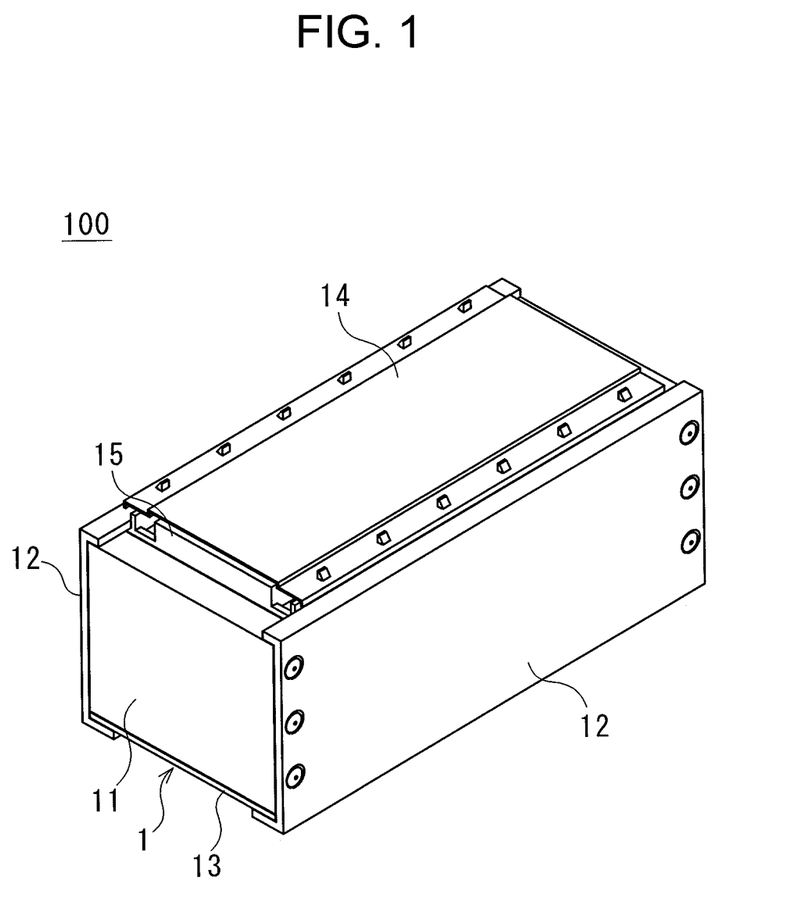
FIG. 1 is a perspective view illustrating an appearance of a battery module according to an exemplary embodiment.
Figure 2:
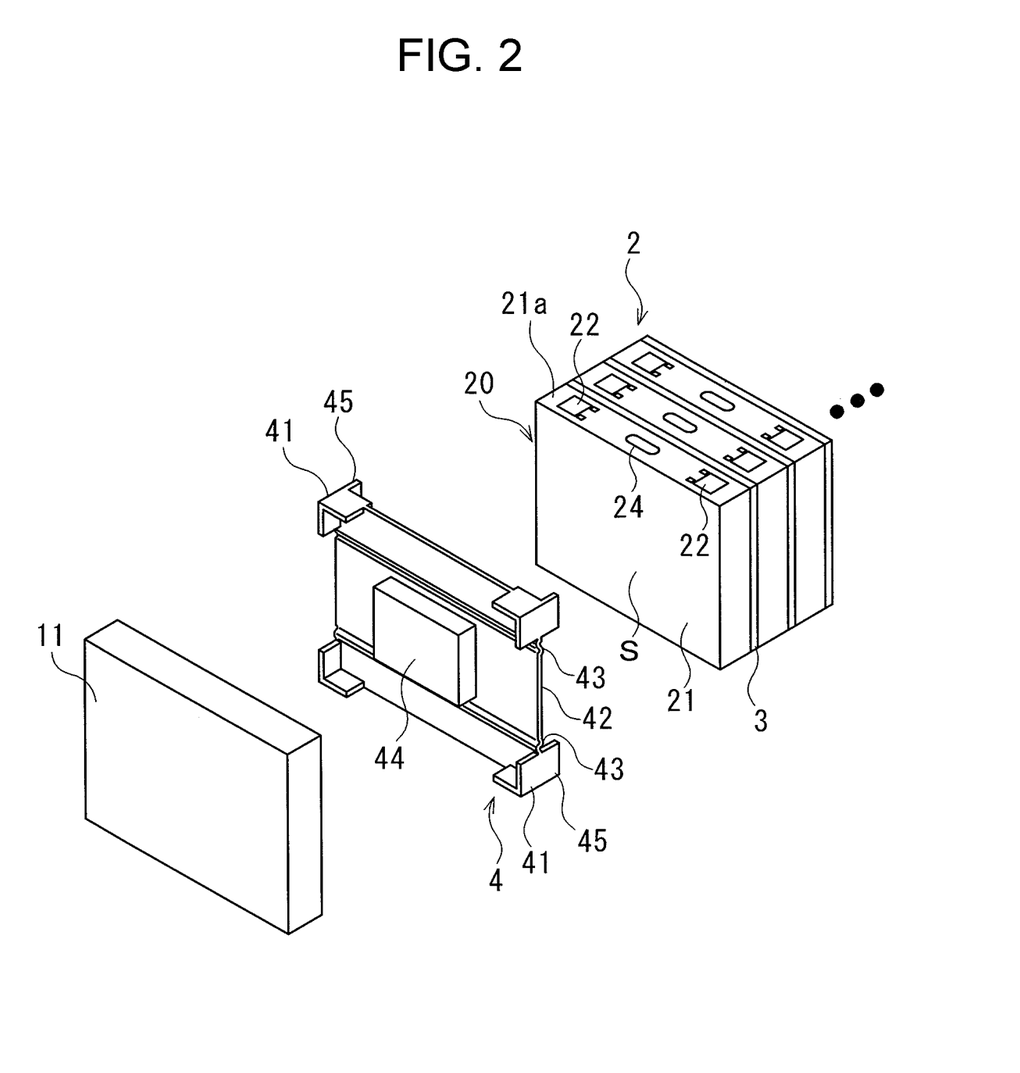
FIG. 2 is an exploded perspective view of a part of the battery module.

FIG. 1 is a perspective view illustrating an appearance of battery module 100 according to an exemplary embodiment, and FIG. 2 is an exploded perspective view of a part of battery module 100. Battery module 100 includes housing 1 having a rectangular-parallelepiped shape, battery stack 2, separator 3, and end separator 4. Battery module 100 includes first support member 41 and second support member 42 on end separator 4, receives an impact load by first support member 41 to suppress displacement of battery 20, absorbs displacement caused by expansion of battery 20 by deformation of second support member 42, and reduces a reaction force generated in the stacking direction.

Housing 1 includes end plate 11, side plate 12, base plate 13, cover plate 14, and bus bar plate 15. End plates 11 are provided outside batteries 20 positioned at both ends of battery stack 2 in the stacking direction of batteries 20. Side plate 12 sandwiches end plate 11 and covers a side surface of battery stack 2. Base plate 13 is configured by covering a bottom of battery stack 2. Cover plate 14 covers an upper surface of battery stack 2. Bus bar plate 15 has a plate shape, is provided between an upper surface of battery stack 2 and cover plate 14, and holds bus bar 28 described later.

Battery stack 2 is housed inside housing 1. Battery stack 2 is formed by stacking a plurality of batteries 20 in one direction. A separator 3 formed of a resin material or the like is provided between the batteries. Separator 3 electrically insulates each battery 20 of battery stack 2. Separator 3 may be considered to constitute a part of battery stack 2 because separator 3 is incorporated into and integrated with battery stack 2.

Each battery 20 is a rechargeable secondary battery such as a lithium-ion battery, a nickel-metal-hydride battery, or a nickel-cadmium battery. Additionally, each battery 20 is a so-called prismatic battery, and has outer covering can 21 having a flat rectangular-parallelepiped shape. One surface of outer covering can 21 is provided with an opening having a substantially rectangular shape not illustrated, and an electrode body, an electrolyte, and the like are accommodated in outer covering can 21 through the opening. Sealing plate 21a that closes the opening of outer covering can 21 is disposed in the opening.

Output terminal 22 of a positive electrode is disposed on sealing plate 21a at a position close to one end of sealing plate 21a in a longitudinal direction, and output terminal 22 of a negative electrode is disposed on sealing plate 21a at a position close to the other end of sealing plate 21a in the longitudinal direction. The pair of output terminals 22 is electrically connected to the corresponding one of a positive electrode plate and a negative electrode plate, constituting the electrode assembly. Respective output terminals 22 are inserted into through-holes (not illustrated) formed in sealing plate 21a. A seal member (not illustrated) having an insulating property is interposed between respective output terminals 22 and respective through-holes. In the following description, for convenience, sealing plate 21a is an upper surface of battery 20, and a bottom surface of outer covering can 21 facing sealing plate 21a is a lower surface of battery 20.

Battery 20 has two main surfaces that connect the upper surface and the lower surface of battery 20 to each other. The main surfaces are surfaces having the largest area out of the six surfaces of battery 20. The main surfaces are long side surfaces connected to the long sides of the upper surface and the long sides of the lower surface. Two remaining surfaces except for the upper surface, the lower surface, and the two main surfaces are referred to as the side surfaces of battery 20. These side surfaces are a pair of short side surfaces connected to the short sides of the upper surface and the short sides of the lower surface. These directions and positions are defined for the sake of convenience. Therefore, for example, the part defined as the upper surface in the present invention does not necessarily mean a part located above the part defined as the lower surface.

Valve 24 is disposed on sealing plate 21a between the pair of output terminals 22. Valve 24 is also referred to as a safety valve. Valve 24 is a mechanism for releasing a gas in each battery 20. Valve 24 is configured to release an internal gas by opening valve 24 when an internal pressure of outer covering can 21 is increased to a predetermined value or more. For example, valve 24 includes: a thin part that is formed on a part of sealing plate 21a and is thinner than other parts of valve 24; and a linear groove formed on a surface of the thin part. In this configuration, when an internal pressure of outer covering can 21 increases, valve 24 is opened by tearing the thin wall part with the groove as a tearing starting point.

The plurality of batteries 20 are stacked at predetermined intervals with the main surfaces of adjacent batteries 20 facing each other. Note that the term "stack" means that a plurality of members are arranged in any one direction. Thus, stacking batteries 20 also includes arranging the plurality of batteries 20 horizontally. In the present exemplary embodiment, batteries 20 are stacked horizontally. Each battery 20 is disposed such that output terminals 22 are directed in the same direction. In the present exemplary embodiment, each battery 20 is disposed such that output terminals 22 are directed upward in the vertical direction.

Figure 3:
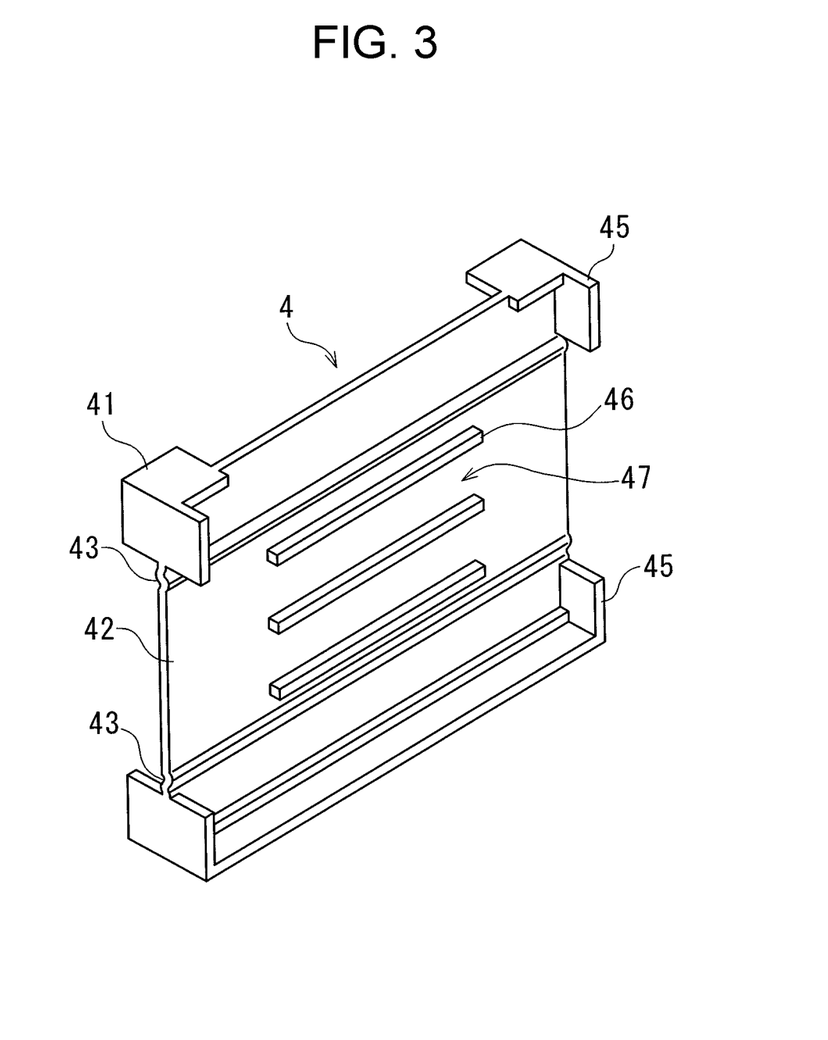
FIG. 3 is a perspective view of an end separator as viewed from a battery side.

End separator 4 is provided between batteries 20 positioned at an end of battery stack 2 in the stacking direction of batteries 20 and end plate 11. FIG. 3 is a perspective view of end separator 4 as viewed from battery 20 side.

End separator 4 includes first support member 41, second support member 42, elastic body 44, and holder part 45. Second support member 42 has a rectangular plate shape, intersects with the stacking direction of batteries 20, is in contact with surface S (main surface) of battery 20 on one surface side, and faces end plate 11 on the other surface side. First support member 41 is provided at each of four corners of second support member 42, has an L shape along two lateral sides intersecting each other at each corner, and is formed to extend in the stacking direction of batteries 20.

First support member 41 is located at a position corresponding to the peripheral edge of surface S of battery 20 when viewed in the stacking direction of batteries 20, and supports the peripheral edge of surface S of battery 20. First support member 41 may be provided at a side part other than the four corners of second support member 42. Second support member 42 is connected to first support member 41 at the peripheral edge. First support member 41 may have a bent plate shape or a columnar shape illustrated in FIG. 2.

Second support member 42 includes deformation allowing part 43 between the peripheral edge connected to first support member 41 and a central portion. Deformation allowing part 43 has a part recessed to one side and a part recessed to the other side in the stacking direction, and has an S-shaped cross section. By providing deformation allowing part 43, the central part of first support member 41 is easily deformed in the stacking direction of batteries 20 with respect to the peripheral edge. Second support member 42 has lower rigidity with respect to deformation in the stacking direction of batteries 20 than first support member 41. The height of deformation allowing part 43 in the stacking direction of batteries 20 is lower than the height of air passage forming part 46 described later, and batteries 20 are in contact with air passage forming part 46. On the peripheral edge of the surface of second support member 42 facing battery 20, there is provided a seat that has the same height as air passage forming part 46 and is in contact with battery 20.

Elastic body 44 is provided at the central part of first support member 41, extends in the stacking direction of batteries 20, and has an end surface in contact with end plate 11. Elastic body 44 is, for example, a spring, rubber, or the like. Holder part 45 is provided on a bottom side of the surface of first support member 41 facing battery 20 and on both lateral sides in the horizontal direction intersecting the stacking direction, and battery 20 is fitted inside holder part 45.

Air passage forming part 46 is provided on a surface of second support member 42 facing battery 20. Air passage forming part 46 includes a plurality of strips protruding from the surface of second support member 42 facing battery 20, and air passage 47 is formed between the strips.

Figure 4:
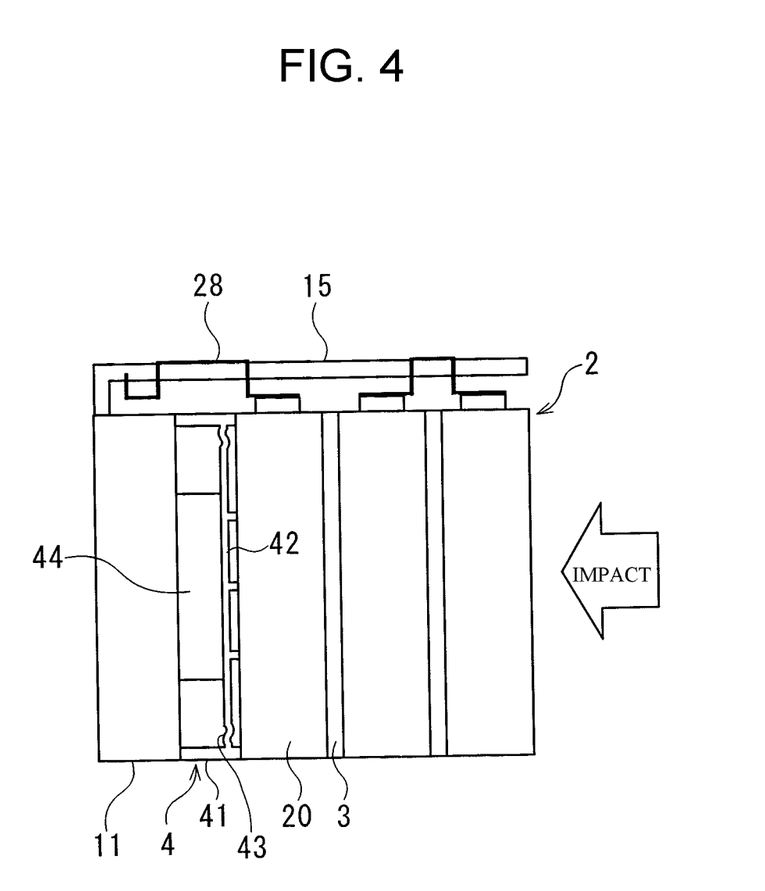
FIG. 4 is a schematic diagram for explaining displacement when an impact load is generated.

Next, the operation of battery module 100 will be described based on displacement when an impact load is generated and generation of a reaction force due to expansion of battery 20. FIG. 4 is a schematic diagram for explaining displacement when an impact load is generated. For example, in a case where battery module 100 is mounted on a vehicle, an impact load is applied to the battery module by collision of the vehicle. When acceleration due to collision acts in the stacking direction of batteries 20 in battery stack 2, each battery 20 receives a collision load so as to move in one direction.

First support member 41 of end separator 4 extends in the stacking direction of batteries 20, and receives a collision load by an axial force of first support member 41. When first support member 41 of end separator 4 is made of a hard resin material, rigidity of first support member 41 with respect to displacement in the stacking direction is increased, and displacement due to a collision load of battery 20 is suppressed to be small. Since the displacement of battery 20 is suppressed, the deformation amount of bus bar 28 is small and the bus bar is hardly damaged.

Figure 5:
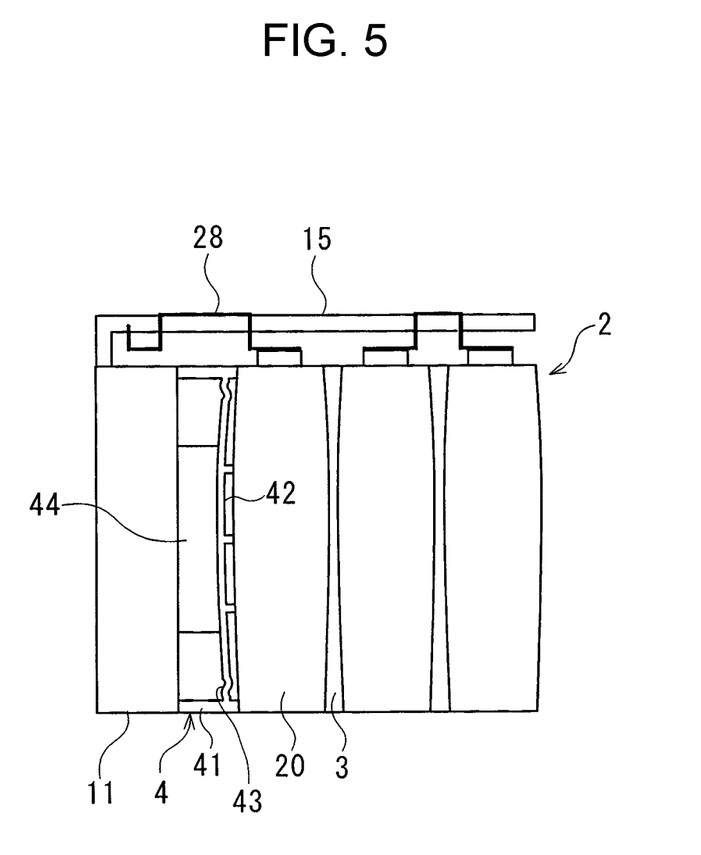
FIG. 5 is a schematic diagram for explaining generation of a reaction force due to expansion of a battery.

FIG. 5 is a schematic diagram for explaining generation of a reaction force due to expansion of battery 20. As described above, in each battery 20, an internal electrode body, an electrolyte, and the like degrade over time, and bulge due to deposition or oxidation of a metal material, and a change appears in an outer shape. Each battery 20 is a prismatic battery and includes the outer covering can 21 having a flat rectangular-parallelepiped shape, and among the six surfaces of battery 20, the main surface having the largest area is deformed so as to expand.

Separator 3 provided in battery stack 2 is deformed by creep and absorbs part of displacement caused by expansion of battery 20, so that the reaction force applied to battery 20 is reduced. Second support member 42 of end separator 4 has lower rigidity with respect to displacement in the stacking direction than first support member 41, and is elastically displaced in the stacking direction of batteries 20, absorbs displacement due to expansion of batteries 20, and can reduce reaction force. Deformation allowing part 43 functions to reduce rigidity with respect to displacement of battery 20 in the stacking direction in second support member 42.

Elastic body 44 of end separator 4 imparts rigidity with respect to displacement of batteries 20 in the stacking direction to second support member 42. Elastic body 44 is made of a spring, rubber, or the like, so that the rigidity can be made lower than that of first support member 41 that receives the displacement in the stacking direction by the axial force, and the rigidity of second support member 42 can be kept low. Even when elastic body 44 is not provided, deformation allowing part 43 can reduce the rigidity of second support member 42 with respect to the displacement in the stacking direction.

End separator 4 is provided with an air passage forming part 46 facing battery 20. Battery module 100 can secure air passage 47 for air cooling of battery 20 while battery 20 is in contact with air passage forming part 46.

Modified Example

Figure 6:
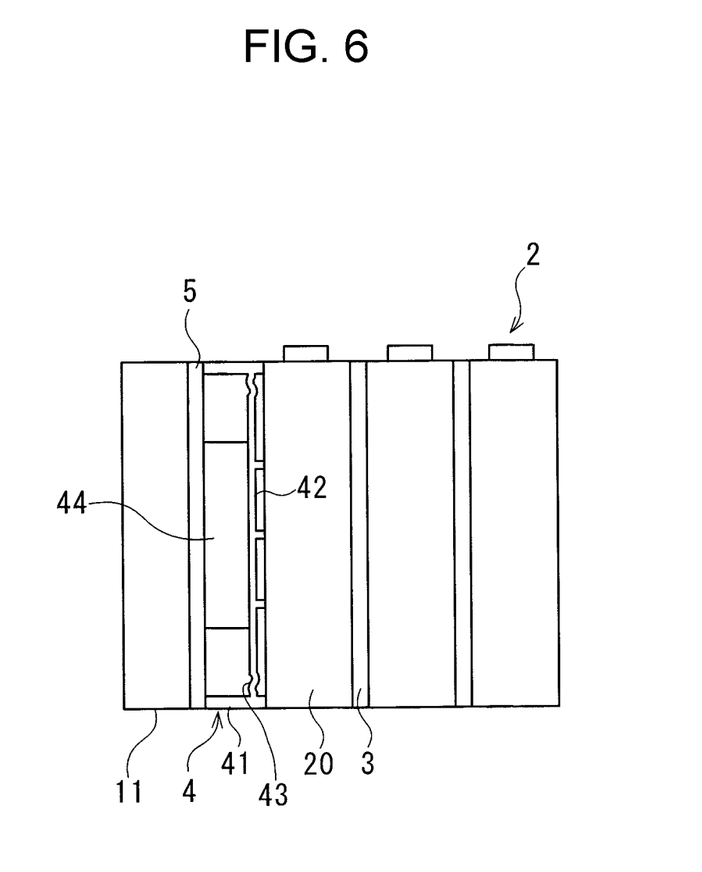
FIG. 6 is a schematic diagram for explaining a battery stack according to a modified example.

FIG. 6 is a schematic diagram for explaining battery stack 2 according to a modified example. In battery stack 2 according to the modified example, plate-shaped buffer member 5 is provided between end plate 11 and end separator 4. Buffer member 5 is made of a resin such as rubber, and softens an impact when an impact load is applied to battery stack 2. Even when battery 20 bulges due to aged degradation, the buffer member 5 deforms in the stacking direction of batteries 20 together with elastic body 44, absorbs the displacement of batteries 20, and reduces the reaction force.

Further, in the above-described exemplary embodiment, elastic body 44 is used, but instead of elastic body 44, a member having larger deformation due to creep than other parts of end separator 4 may be provided. Also in this case, the displacement due to the expansion of battery 20 can be absorbed by the creep of the member, and the reaction force can be reduced.

The present invention has been described based on the exemplary embodiment of the present invention. As a person skilled in the art understands, the exemplary embodiment is exemplified, and the exemplary embodiment is variously varied and modified within a scope of claims of the present invention. Further, such variations and modified examples fall within the scope of the claims of the present invention. Therefore, it should be understood that the description and the drawings herein are not limitative, but are illustrative.

The exemplary embodiment may be defined by the following items.

[Item 1]

Battery module (100) including: battery stack (2) in which a plurality of batteries (20) are stacked; end plate (11) provided outside battery (20) at an end in a stacking direction of the plurality of batteries (20); and end separator (4) provided between battery (20) at the end and end plate (11), end separator (4) including first support member (41) that supports a peripheral edge of a surface intersecting the stacking direction of the battery (20) at the end, and second support member (42) that supports a central portion of the surface and has lower rigidity against deformation in the stacking direction than first support member (41). Thus, battery module (100) can suppress the displacement of the battery against the collision load while reducing the reaction force generated in the stacking direction in battery module (100).

[Item 2]

Battery module (100) according to Item 1, in which first support member (41) is disposed to extend in the stacking direction. Accordingly, in battery module (100), rigidity of first support member (41) against displacement in the stacking direction is increased, and displacement due to a collision load of battery (20) is suppressed to be small.

[Item 3]

Battery module (100) according to Item 2, in which second support member (42) is disposed in a plate shape in contact with the surface and connected to first support member (41) at a peripheral edge, and includes deformation allowing portion (43) in which a portion recessed to one side and a portion recessed to another side in the stacking direction are disposed between a peripheral edge and a central portion. Thus, battery module (100) reduces rigidity of second support member (42) against displacement of batteries (20) in the stacking direction.

[Item 4]

Battery module (100) according to any one of Items 1 to 3, in which second support member (42) includes elastic body (44) disposed to extend in the stacking direction at a central portion of the surface. Accordingly, in battery module (100), rigidity of second support member (42) can be kept low by elastic body (44).

REFERENCE MARKS IN THE DRAWINGS 11 end plate
2 battery stack 20 battery
4 end separator
41 first support member
42 second support member
43 deformation allowing part
44 elastic body
100 battery module

The invention claimed is:

1. A battery module comprising:

a battery stack including a plurality of batteries stacked in a stacked direction;

an end plate provided outside a battery at an end in the stacking direction among the plurality of batteries; and an end separator provided between the battery at the end and the end plate, the end separator including a first support member that supports a peripheral edge of a surface of the battery at the end, the surface intersecting the stacking direction, and a second support member that supports a central part of the surface and includes lower rigidity with respect to deformation in the stacking direction than a rigidity of the first support member, wherein the second support member is disposed in a plate shape in contact with the surface and connected to the first support member at a peripheral edge of the second support member, and includes a deformation allowing part in which a part recessed to one side and a part recessed to another side in the stacking direction are disposed between the peripheral edge and a central part of the second support member.

2. The battery module according to claim 1, wherein the first support member is disposed to extend in the stacking direction.

3. The battery module according to claim 1, wherein the second support member includes an elastic body disposed to extend in the stacking direction at a central part of the surface.

* * * * *